United States Patent [19]
Reed

[11] Patent Number: 5,649,293
[45] Date of Patent: Jul. 15, 1997

[54] METHOD FOR ASSIGNING SUBSCRIBERS BETWEEN NARROWBEAM SECTORS

[75] Inventor: John Douglas Reed, Arlington, Tex.

[73] Assignee: Motorola, Inc., Schaumburg, Ill.

[21] Appl. No.: 450,057

[22] Filed: May 25, 1995

[51] Int. Cl.$^6$ ................................................ H04Q 7/22
[52] U.S. Cl. ........................................ 455/453; 455/447
[58] Field of Search ........................ 455/33.3, 33.1, 455/33.2, 33.4, 54.1, 54.2, 56.1, 62, 63; 379/59, 60

[56] References Cited

U.S. PATENT DOCUMENTS

| | | | |
|---|---|---|---|
| 4,670,899 | 6/1987 | Brody et al. | 455/33.4 X |
| 5,241,685 | 8/1993 | Bodin et al. | 455/33.2 |
| 5,276,907 | 1/1994 | Meidan | 455/33.3 |
| 5,367,559 | 11/1994 | Kay et al. | 379/60 |

OTHER PUBLICATIONS

Williams, Jim, "Capacity Dynamics in Cellular Mobile Telephone Systems", Telecommunications, 1983, pp. 32–38.
Chan, Gerald K., "Effects of Sectorization on the Spectrum Efficiency of Cellular Radio Systems", IEEE Transactions on Vehicular Technology, vol. 41, No. 3, 1992, pp. 217–225.

*Primary Examiner*—Reinhard J. Eisenzopf
*Assistant Examiner*—Philip J. Sobutka
*Attorney, Agent, or Firm*—Bruce Terry

[57] ABSTRACT

A method for assigning subscribers between narrowbeam sectors includes, in a first embodiment, off-loading subscribers to alternate sectors when a current sector becomes loaded beyond a loading threshold. The subscriber(s) having the greatest signal quality measure (e.g., power setting) are preferably selected for off-loading, since such are typically in regions having the greatest overlap with other sectors (e.g., close to the antennas). The selected subscriber(s) are transferred to an alternate sector, preferably one having the best received signal quality with the subscriber and also having loading beneath the loading threshold.

19 Claims, 2 Drawing Sheets

FIG.1
-PRIOR ART-
ERLANG B TABLE
(2% BLOCKING)
| SERVERS | ERLANGS |
|---|---|
| 3 | 0.06 |
| 4 | 1.09 |
| 5 | 1.65 |
| 6 | 2.27 |
| 7 | 2.93 |
| 8 | 3.62 |
| 9 | 4.34 |
| 10 | 5.08 |
| 11 | 5.84 |
| 12 | 6.61 |
| 13 | 7.40 |
| 14 | 8.20 |
| 15 | 9.00 |
| 16 | 9.82 |
| 17 | 10.65 |
| 18 | 11.49 |
| 19 | 12.33 |
| 20 | 13.18 |
FIG.2
-PRIOR ART-
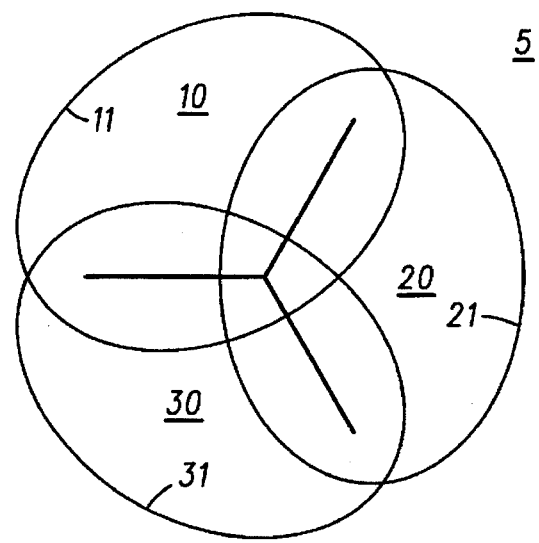
FIG.4
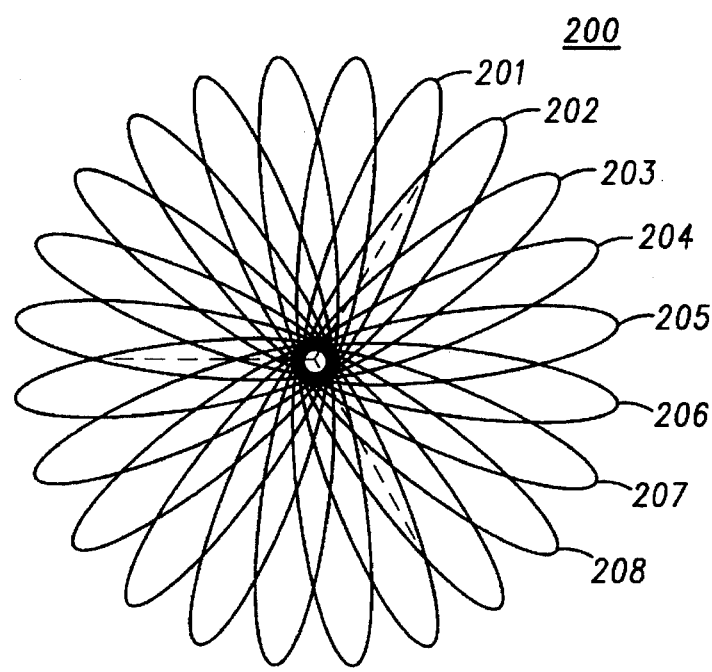

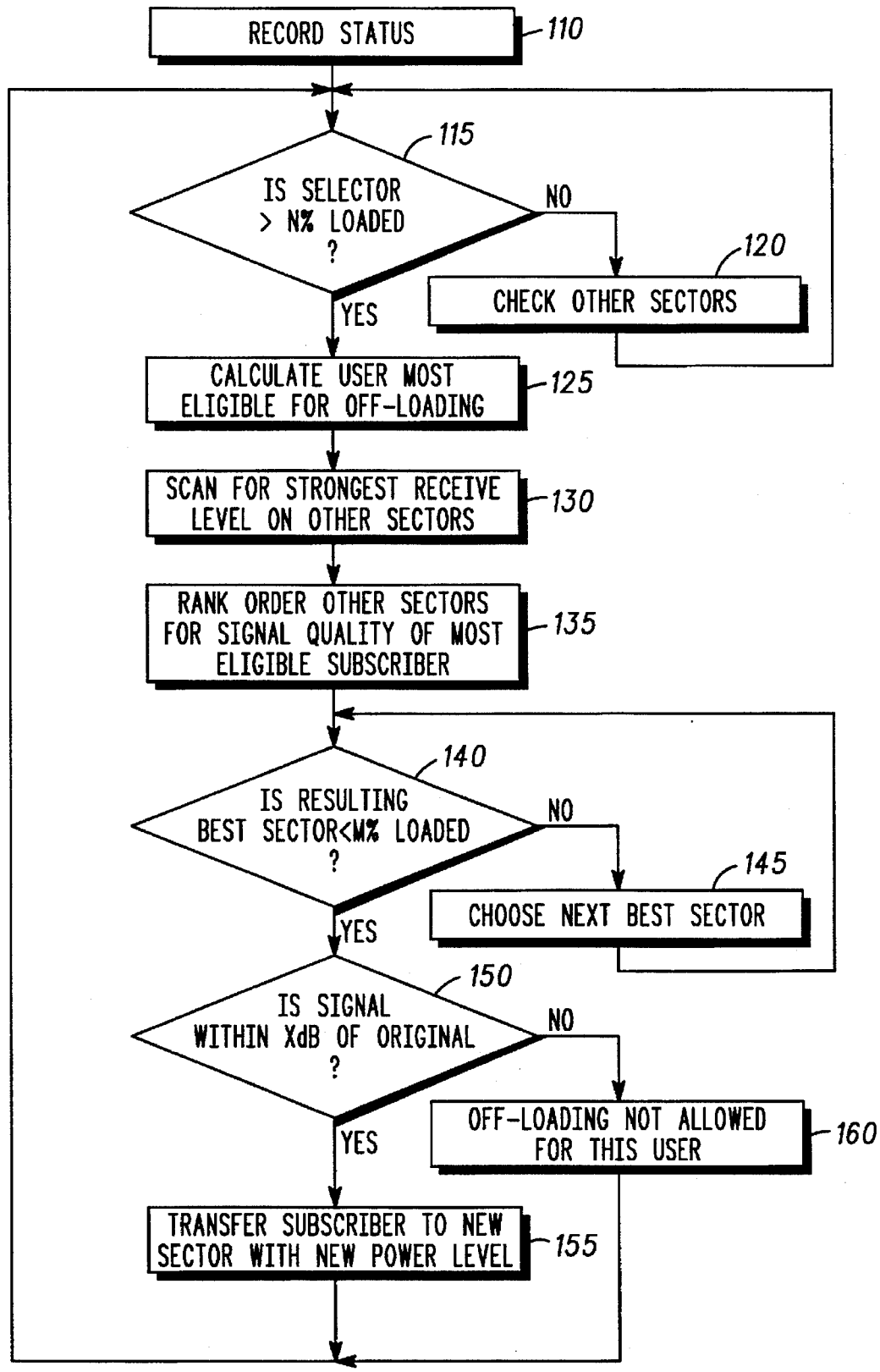

METHOD FOR ASSIGNING SUBSCRIBERS BETWEEN NARROWBEAM SECTORS

FIELD OF THE INVENTION

This invention relates in general to communication systems and, in particular, to a method of assigning a subscriber's channel in a communications system.

BACKGROUND OF THE INVENTION

Cellular radio systems use base station radio transceivers that are mounted, typically on buildings or on towers, to supply radio signals in their service areas. In the classical analog systems, and in most digital systems, a number of communications channels having separate frequencies are used at each base station, and these channels are reused at other base stations that are spaced apart by a minimum reuse distance. To improve the efficiency of this reuse, sectorized antennas are used to divide a cell into 3 or more sectors. By dividing the cell in this way, the typical analog cellular system can reduce its reuse pattern from 12 cells in a cluster down to 7 cells per cluster, a cluster being the number of cells with unique frequency/channel sets before reuse is allowed. Thus, by reducing the cluster size, more channels are available at each cell, which yields an improvement in capacity.

However, by dividing an omni pattern into a sectored pattern, the transmit and receive antennas in a given sector will only see a fraction of the sector. Because of this, the frequency assignments must be divided among the sectors. In other words, given sectors 1, 2 and 3, the channels in sector 1 cannot, in general, be used to cover sectors 2 or 3 since the antennas point in different directions. Thus, there are now separate frequency groups for each sector if the cell is sectorized.

FIG. 1 is a prior art table of the Erlang B distribution. This is given here as background information describing the effect of subdividing the typical 3 to 6 sector base stations into a much larger number of sectors. Typically for AMPS (Advanced Mobile Phone Service) cellular, a 3 sector 7-cell/cluster system could be assumed to have up to 19 channels per sector with an evenly distributed frequency assignment plan. By adding additional sectors, the number of frequencies per sector generally goes down, even with the cluster size being reduced. For a 6 sector 4-cell/cluster system, the number of channels is reduced to 16 per sector. Since there are currently proposals suggesting numbers of sectors up to 24 per cell, the number of channels per sector will be significantly less when they are equally divided as in a standard reuse plan. FIG. 1 shows the effect of having fewer servers in a channel set. The result is a loss in trunking efficiency, i.e., the average number of servers that can be supported decreases faster than the number of channels.

FIG. 2 is a prior art diagram illustrating a standard 3 sector pattern for a base station coverage area 5 in which each sectors 10, 20, 30 are each served by a 120 degree antenna pattern 11, 21, 31. These sectors 10, 20, 30 are typically implemented by using three separate antennas mounted on a building or tower.

The actual capacity at each cell or sector, if the cell is divided into sectors, is a function of the number of frequencies that are available in each frequency group. Since user traffic is not a uniform process, i.e., users tend to arrive in a manner typical of a Poisson process, and with exponential call durations, the capacity is normally specified as an Erlang B capacity at a given blocking rate. For example, if a there were 19 frequencies available in a given sector, then according to the Erlang B table, an average of 12.5 users can be served and this will give a blocking rate of 2%, which means that 2% of the time, more than 19 users will try to obtain service. Thus, a channel set of 19 frequencies would support 12.5 Erlangs of traffic at the given grade of service (GOS) or blocking percentage.

Sectorization typically improves the range and capacity of a cell—the range due to the added antenna gain that is inherent with sectorized antennas, and the capacity due to improvements in reuse. Therefore, it should be of benefit to increase the number of sectors within a cell to some very large number. The typical numbers of sectors used in the world today are 3 to 6. The problem with using more than 6 sectors, however, is the effect of dividing the frequency group into smaller and smaller groups. It is typically desirable to keep a small, say 3-sector, group of frequencies, while being able to switch the frequencies within this group for use via a narrower beam within this channel set. However this would require an enormous amount of hardware to switch say 20 frequencies to any number of beams within a 120 degree sector. Thus it would be desirable to simply divide the frequency group into the number of beams that are to be supported. This produces a limitation in capacity however, since the number of Erlangs decreases rapidly. For example, with 8 channels per beam, and a 2% GOS, only 2.5 Erlangs is available in each beam.

There remains, therefore, a need for an improved method of assigning channels to subscribers in a narrow beam communication system.

BRIEF DESCRIPTION OF THE DRAWINGS

FIG. 1 is a prior art table of Erlang B loading for 2% blocking;

FIG. 2 is a diagram illustrating a typical prior art 3 sector antenna pattern for a base site coverage area;

FIG. 3 is a flow diagram illustrating a first embodiment process according to the invention; and FIG. 4 is a diagram illustrating a narrow beam antenna pattern implementation according to the first embodiment of the invention.

DETAILED DESCRIPTION

These and other problems are met by the improved method of the present invention. In a first embodiment of the invention, the apparent capacity of a sector is improved by dynamically off loading users who are sufficiently close to the base when the loading of the sector is close to its peak capacity. Thus, when the sector is sufficiently full, e.g., being within some predetermined number of users from a maximum, or at the maximum, the users being served are identified as to their potential to be served from another sector which is more lightly loaded. This results in more averaging and less peaking in the channel usage within a group of sectors, i.e., load sharing, thus holding off the point at which blocking occurs within a given sector. This in turn advantageously increases the capacity that the cell can serve.

This process is more difficult to implement with a standard 3 sector pattern for users that are further away since the antennas point at such dramatically different (obtuse) angles. The closest users would benefit from very low path losses due to their short distance to the base, and the signal propagation effect of local scattering which will enhance the path to an adjacent sector due to reflections and diffractions produced by nearby clutter. However, bases having numerous narrow beams, being overlapping beams and whose angle between sectors is smaller, require minimal local scattering is minimal to couple a signal into adjacent sectors is minimal. Also, typical environments will exhibit sufficient local scattering to provide a sufficiently good signal path from up to several sectors, depending on their angles with respect to the subscriber. Users that are close to the base station are more likely to have paths into adjoining sectors that are sufficiently good, thus permitting users to be reassigned to those sectors. Far away users, near the edge of the cell, will have less overall path margin left, and will be operating at near the limit of the system gain.

Therefore, it is typically desirable, according to this first embodiment of the invention, to select the closer users for off-loading onto adjacent sectors when the first sector is near its capacity limit. The identification of a close user can be made based on any convenient measure, such as power control level, the amount the subscriber is powered down, (in some digital systems) a timing advance used to measure the distance based on time of flight of the radio propagation between base and subscriber, etc. The power control method is discussed below as part of the first embodiment since it currently appears to be the most widely used method which should work with nearly every type of cellular system.

Turning now to FIG. 3 a flow diagram, generally designated 100, illustrating a process according to a preferred first embodiment of the present invention is shown. The flow chart begins at block 110 where the communications channel utilization for each narrow beam sector at the base station is monitored and usage statistics are recorded (e.g., as subscriber call or channel usage changes). Such statistics are preferably a loading level (e.g., number of users divided by total channels, or number of channels not in use), but can include any loading measure, e.g., periodic channel usage such as percentage of frame occupancy (as in an ETDMA (enhanced time division multiple access) system), adaptive measures etc. Block 115 is then preferably executed which identifies a sector which is nearly loaded, e.g., a sector having very few channels available for new calls. If the sector is not loaded past a predetermined loading threshold, block 120 is executed which looks at the next sector.

Once a sector is loaded beyond the predetermined threshold, the current users being served by that sector are analyzed in block 125 to determine the most eligible user (or subscriber communication channel) to be off-loaded/reassigned onto another sector. The criterion to specify the most eligible user is preferably each user's power setting, although as noted above, any suitable off-loading quality measure (or reassignment quality measure) for transfer (e.g., hand-off or switching) to another sector maybe used. Users with the lowest power setting are preferably selected here since such are the users that are typically close to the base station. In cellular radio systems, there are typically a number of power settings for a subscriber's transmit power level, e.g., each being a given number of dB from the next setting. By determining the subscribers communicating via the sector and picking the user(s) with the highest power setting, the closest user(s) to the base station are most likely selected. An additional selection criterion that can be used is the amount of time that the subscriber has spent above a given power level. This further divides the group into users who have been close for the longest amount of time.

The resulting quality measure, or Q-factor, can thus be specified as $Q=A*PL+B*T+C$, where A & B are scaling coefficients that can be adjusted by the designer, PL is the power level of the signal received at the base station that is adjusted for the transmit power setting of the subscriber unit, and T is the time that the subscriber has been set to a given power setting (thus indicating its consistency of operation). C is a constant used to scale the quantity into the proper range. As an example of how the Q factor is used, consider a case where the subscriber power levels vary from 0–9 in integer values, with 9 being the strongest. Assume also that $B=0.2$ for $T<10$ s (seconds), and $B=2.0$ for $T>10$ s (so that the quantity $B*T$ ranges from 0–2 and stays at 2 for T larger than 10 seconds). In this case, Q will range from 0–11 over all possible ranges, with $C=0$. Thus, the power level is the larger contributor to the Q factor, but the time adds a smaller variation to the total quantity. As an alternative method, both the signal level and the time the user has been above a signal level threshold could be specified separately with two different parameters. This would not change the operation of the embodiment, but will give the user a somewhat different set of parameters to adjust.

Again, a skilled artisan will appreciate that a variety of other factors can be used to specify the quality measure, and changing the constituent factors, or adding additional parameters, is still within the scope of the inventive process for evaluating a subscriber as eligible for selection for off-loading/hand-off.

Once the most eligible user is chosen, e.g., based on the Q-factor, scanning receivers for each of a group of sectors at the base station are preferably used to scan for the selected user to obtain a reading of its receive signal quality, e.g., its power level in a received signal, optionally along with an identifying tone, or digital word. This is accomplished in block 130, which operation will typically include the proper averaging intervals in order to average out the fast fading (Rayleigh) fluctuations to obtain an estimate of the local mean power level. The group can be predetermined as the n closest/neighboring sectors (and serving antennas), all serving antennas from the source panel as the loaded sector, all sectors of the cell, or any other convenient means.

Block 135 orders the resulting readings for further processing in block 140, which compares the ordered list to a channel loading threshold for each sector. If the best sector is not below a predetermined loading threshold, block 145 selects the next sector in the ordered list (i.e., the sector having the next-greatest quality measure) for testing in block 140. After a sector is found that passes the predetermined loading threshold, block 150 is preferably executed.

In block 150, the signal level is tested and compared with the level indicated by the quality measure which was determined in block 125. If the difference between these two is within a given number of dB, then the subscriber unit is preferably transferred to a new server (e.g., a transceiver port) on a different sector, and the power level is set at an appropriate value for operation on this new server, as shown at block 155. Alternatively, the same server is retained while switching it to the new serving sector, optionally at a new frequency. After completing block 155, the process returns to the beginning.

If the result of block 150 is negative, then the user is not allowed to be switched, as shown at block 160, since the amount of degradation is considered too large based on the threshold of block 150. Preferably, block 150 is defined as a function of the signal level, with different amounts of signal degradation being allowed based on the starting level. Thus, if the signal were strong before the transfer attempt, then more signal degradation would be allowed; however, if the signal level was weaker, then less degradation would be allowed. A minimum signal level floor may also be specified in this way.

FIG. 4 is a diagram illustrating a cell 200 with a number of narrow-beam sectors in which the present invention can be used. In this case, there are 24 narrow-beam sectors, generated by three panel antennas, each with 8 beams (e.g., 201-208 in a 120 degree coverage area radiated from one panel) of 15 degree beam width each.

Therefore, it will be apparent to one skilled in the art that there has been provided in accordance with the invention, a method for reassigning subscribers from a loaded narrow-beam sector that fully satisfies the objectives, aims, and advantages set forth above.

While the invention has been described in conjunction with specific embodiments thereof, it is evident that many alterations, modifications, and variations will be apparent to those skilled in the art in light of the foregoing description. For example, the invention is not limited in application to just cellular communication systems, but also applies to other types of communication systems employing narrow-beam antennas. Accordingly, the invention is intended to embrace all such alterations, modifications, and variations within the spirit and scope of the appended claims.

I claim:

1. A method for load-sharing between a plurality of sectors of a base station, comprising:
   (a) monitoring a loading level for each sector of the plurality of sectors of the base station;
   (b) in response to a first sector's loading level exceeding a predetermined threshold, selecting a first subscriber, communicating via the first sector, that is located closer to the base station than a second subscriber communicating via the first sector; and
   (c) off-loading the first subscriber to a further sector of the base station for communications with the first subscriber.

2. The method of claim 1, wherein the loading level is a number of available channels for use in said each sector, and the step of monitoring comprises updating said number of available channels for use in said each sector based on changes in a subscriber call activity.

3. The method of claim 1, wherein the loading level is a number of channels being used in said each sector, and the step of monitoring comprises updating said number of channels being used in said each sector based on changes in a channel use parameter.

4. The method of claim 1, wherein the loading level is a number based on a channel utilization in said each sector, and the step of monitoring comprises periodically updating said number based on changes in said channel utilization.

5. The method of claim 1, wherein each subscriber has a transmit power level, and wherein the step of selecting a first subscriber includes selecting a subscriber having a lowest transmit power level.

6. The method of claim 1, wherein each subscriber has a transmit power level, and wherein the step of selecting a first subscriber includes selecting a first subscriber based upon time of flight of radio signal propagation.

7. The method of claim 1, wherein step (c) comprises the steps of:
   measuring a receive signal quality of a signal from the first subscriber by other sectors of the plurality of sectors of the base station;
   selecting a further sector having the greatest receive signal quality from the first subscriber; and
   establishing communications for the first subscriber via the selected further sector.

8. The method of claim 7, wherein the step of measuring includes measuring by all further sector antennas of an antenna panel with a first sector antenna serving the first sector.

9. The method of claim 7, wherein the step of measuring includes measuring by a group of predetermined neighboring sector antennas wherein the group comprises at least all further sector antennas serving adjacent sectors to the first sector.

10. The method of claim 7, wherein the step of measuring includes measuring said receive signal quality of a signal from the first subscriber by the other sector antennas wherein the receive signal quality is a measure of receive signal strength.

11. The method of claim 7, wherein step (c) further comprises only establishing communications via the further sector when the further sector has a further loading level that is less than a further predetermined threshold.

12. The method of claim 11, wherein when the further loading level exceeds the further predetermined threshold, step (c) further comprises establishing communications via a still further sector having a next greatest receive signal quality.

13. A method for reassigning subscriber communication channels for subscribers communicating via a base station having a plurality of sectors, comprising:
   (a) measuring a level of communications channel utilization for each sector;
   (b) in response to the level of a first sector of the narrowbeam sectors exceeding a predetermined threshold, selecting a first subscriber communication channel, communicating via the first sector, that is used by a subscriber located closer to the base station than a second subscriber communicating via the first sector; and
   (c) reassigning the first subscriber communication channel to a further sector of the plurality of sectors for communications with the first subscriber.

14. The method of claim 13, wherein step (a) further comprises measuring the level of communications channel utilization for each sector wherein the level is a number of available channels for use in said each sector.

15. The method of claim 13, wherein the step of measuring comprises periodically updating the level based on changes in communications channel utilization for each sector.

16. The method of claim 13, wherein each subscriber has a transmit power level, and wherein the step of selecting a first subscriber includes selecting a subscriber based upon having a low transmit power level for a period of time.

17. The method of claim 13, wherein step (c) comprises:
   measuring receive signal quality of the first subscriber communication channel by other sectors of the plurality of sectors of the base station to determine a further sector measuring the greatest receive signal quality; and
   transferring the first subscriber communication channel for communications via the further sector.

18. The method of claim 17, wherein the step of transferring comprises switching the first subscriber communication channel from a first antenna serving the first sector to a further antenna serving the further sector.

19. The method of claim 17, wherein the step of transferring comprises switching the first subscriber communication channel from a first frequency via a first antenna serving the first sector to a second frequency via a further antenna serving the further sector.

* * * * *